(12) United States Patent
Kohler et al.

(10) Patent No.: US 7,066,004 B1
(45) Date of Patent: Jun. 27, 2006

(54) INERTIAL MEASUREMENT UNIT USING ROTATABLE MEMS SENSORS

(75) Inventors: Stewart M. Kohler, Albuquerque, NM (US); James J. Allen, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 48 days.

(21) Appl. No.: 10/932,957

(22) Filed: Sep. 2, 2004

(51) Int. Cl.
*G01P 21/00* (2006.01)

(52) U.S. Cl. ............................ 73/1.38; 702/88; 702/96

(58) Field of Classification Search ................ 73/510, 73/511, 504.04, 622, 623, 493, 1.38, 1.37, 73/1.78, 1.77; 702/95, 88
See application file for complete search history.

(56) References Cited

U.S. PATENT DOCUMENTS

| | | | |
|---|---|---|---|
| 4,590,801 A * | 5/1986 | Merhav ........................ 73/510 |
| 5,067,084 A * | 11/1991 | Kau ........................... 701/220 |
| 5,190,637 A | 3/1993 | Guckel |
| 5,272,922 A | 12/1993 | Watson |
| 5,378,583 A | 1/1995 | Guckel et al. |
| 5,631,514 A | 5/1997 | Garcia et al. |
| 5,818,227 A | 10/1998 | Payne et al. |
| 5,917,260 A | 6/1999 | Garcia et al. |
| 5,959,376 A | 9/1999 | Allen |
| 6,313,562 B1 | 11/2001 | Barnes et al. |
| 6,338,274 B1 | 1/2002 | Carroll |
| 6,393,913 B1 | 5/2002 | Dyck et al. |
| 6,539,799 B1 | 4/2003 | Handrich et al. |
| 6,621,266 B1 | 9/2003 | Payne et al. |
| 6,647,785 B1 | 11/2003 | Stewart et al. |
| 6,671,648 B1 | 12/2003 | McCall et al. |
| 6,725,719 B1 | 4/2004 | Cardarelli |
| 6,738,721 B1 * | 5/2004 | Drucke et al. ................ 702/95 |
| 6,778,908 B1 * | 8/2004 | Martorana et al. ............ 702/9 |
| 6,778,924 B1 * | 8/2004 | Hanse ........................ 702/88 |
| 6,848,304 B1 * | 2/2005 | Geen ....................... 73/504.04 |
| 6,888,662 B1 * | 5/2005 | Abu-Ageel ................. 359/290 |

OTHER PUBLICATIONS

J.J. Allen, et. al., "Integrated Micro-Electro-Mechanical Sensor Development for Inertial Applications", PLANS'98, Position Location and Navigation Symposium, Apr. 20-23, 1998, Rancho Mirage, CA.
S.M. Kohler, "MEMS Inertial Sensors with Integral Rotation Means", Sandia Report #SAND2003-3388, Printed Sep. 2003.

\* cited by examiner

*Primary Examiner*—Helen Kwok
(74) *Attorney, Agent, or Firm*—William R. Conley

(57) ABSTRACT

A MEM inertial sensor (e.g. accelerometer, gyroscope) having integral rotational means for providing static and dynamic bias compensation is disclosed. A bias compensated MEM inertial sensor is described comprising a MEM inertial sense element disposed on a rotatable MEM stage. A MEM actuator for drives the rotation of the stage between at least two predetermined rotational positions. Measuring and comparing the output of the MEM inertial sensor in the at least two rotational positions allows, for both static and dynamic bias compensation in inertial calculations based on the sensor's output. An inertial measurement unit (IMU) comprising a plurality of independently rotatable MEM inertial sensors and methods for making bias compensated inertial measurements are disclosed.

23 Claims, 8 Drawing Sheets

INERTIAL MEASUREMENT UNIT USING ROTATABLE MEMS SENSORS

The United States Government has certain rights in this invention pursuant to Department of Energy Contract No. DE-AC04-94AL85000 with Sandia Corporation.

FIELD OF THE INVENTION

The present invention relates to micromechanical and microelectromechanical (MEM) inertial sensors. The invention further relates to bias error compensation of MEM inertial sensors by providing integral rotational means. The invention also relates to Inertial Measurement Units (IMUs) comprised of MEM inertial sensors having integral rotational means.

BACKGROUND OF THE INVENTION

An Inertial Measurement Unit (IMU) can be comprised of multiple inertial sensors; e.g. angular rate sensors (gyroscopes, gyros) and acceleration sensors (accelerometers) arranged to measure the rotational and translational motion of a body. Calculations based on the measured outputs from the inertial sensors can be used to determine the path and/or orientation of a body moving within a physical space. Because of the potential for significant size, weight and cost savings, there is a desire within the art to incorporate MEM (microelectromechanical) inertial sensors into an IMU. However, due to the relatively poor bias stability of currently available MEM inertial sensors (e.g. on the order of 50°/hr, this has not been possible in applications of an IMU that require an accuracy greater than the currently available MEM sensors can provide. The present invention satisfies the need for MEM inertial sensors having improved bias stability, and hence greater sensor accuracy, by providing MEM inertial sensors comprising integral, MEM rotational means. An IMU according to the present invention comprising gyros and accelerometers fabricated in MEM technology with integral rotational means, provides a significant reduction in the cost, size and weight of an IMU, and having an improved accuracy.

MEM fabrication technologies may include surface micromachining, bulk micromachining, focused ion beam (FIB) processing and LIGA (Lithographie, Galvanoformung, Abformung). In the context of this disclosure, micromechanical, microelectromechanical (MEM), integrated microelectromechanical (IMEM) sensors, sense elements, stages, accelerometers, angular rate sensors (e.g. gyroscopes), manufactured using surface micromachining, bulk micromachining, FIB or LIGA technologies, are all included in the definition of a MEM or micromechanical device. Typical dimensions for micromechanical structures comprising a MEM device range from about a micron up to about a millimeter or greater.

An example LIGA technology comprises lithographic processing of a resist material (e.g. polymethylmethacrylate, PMMA) sensitive to x-ray radiation. The PMMA is typically adhered to a flat, planar surface such as that of a silicon wafer, having a thin layer of metal (e.g. as a release layer) on its surface. Highly parallel x-rays from a synchrotron radiation source are incident upon a mask patterned with a high atomic number (Z) absorber (e.g. chromium). The absorbers on the mask are thick enough to prevent the penetration of x-rays. In the open areas of the mask, the radiation passes through and exposes the PMMA resist. The resist is then chemically developed causing the exposed areas to be washed away. The resulting PMMA structure is then used as a mold for an electro-deposition, to produce a metal (e.g. nickel, nickel-iron alloys, copper, gold etc.) part in the developed regions, replicating the outline of the original mask pattern. The metal parts can then be chemically released from the supporting wafer by dissolving away the PMMA and underlying release layer, and used as is, or the electroplated part can be used as a mold for replication from another material such as a plastic or ceramic. The LIGA process produces MEM parts, which must subsequently be assembled to complete a device. Minimum feature size can be approximately 20 microns. Feature thicknesses can range from about 100 micron to 3 millimeter. Feature size to thickness, aspect ratio's, are typically maintained up to about 50:1.

An example surface micromachining technology based on polysilicon structures, adapts planar fabrication process steps found in the integrated circuit (IC) industry, applied to silicon or silicon on insulator (SOI) wafers, to manufacture microelectromechanical or micromechanical devices. The standard building-block processes for polysilicon surface micromachining are deposition and photolithographically patterning of alternate layers of low-stress polycrystalline silicon (e.g. polysilicon) and a sacrificial material (e.g. silicon dioxide or a silicate glass). Vias etched through the sacrificial layers at predetermined locations provide anchor points to a substrate and can form mechanical and electrical interconnections between the polysilicon layers. Functional elements of the device are built up layer by layer by repeating a series of deposition and patterning process steps. After the device structure is completed, it can be released for movement by removing the sacrificial material using a selective etchant such as hydrofluoric acid (HF) which does not substantially attack the polysilicon layers.

The result is a construction system generally consisting of a first layer of polysilicon which provides electrical interconnections and/or a voltage reference plane, and up to three or more additional layers of mechanical polysilicon which can be used to form functional elements ranging from simple cantilevered beams and compliant electrical interconnects, to complex systems such as electrostatic motors connected to a plurality of gears. Typical in-plane lateral dimensions of the functional elements can range from one micron to several hundred microns, while the layer thicknesses are typically about 1 to 2 microns. Because the entire process is based on standard IC fabrication technology, a large number of fully assembled devices can be batch-fabricated on a silicon substrate without any need for piece-part assembly.

An impediment to the application of inertial sensors fabricated in MEM technologies is the poor bias stability of currently available MEM sensors (for example, on the order of 50°/hr). Poor bias stability, also referred to as drift, can lead to errors in the sensors output, thus yielding errors in the calculated position, or calculated orientation, of a moving body to which the MEM inertial sensor is attached.

According to the present invention, a MEM inertial sensor having improved bias stability is provided comprising integral MEM means for rotating the MEM sensor which allows measurement of the sensor's output at different rotational angles. According to the present invention, sum and differencing calculations based on the output of the MEM sensor measured in initial and rotated positions, can determine the bias error of the sensor, allowing the error to be accounted for and/or compensated for in subsequent inertial measurement calculations. The present invention provides significant size, cost and weight reductions in producing an IMU.

SUMMARY OF THE INVENTION

A bias-compensated MEM inertial sensor according to the present invention comprises a MEM sense element (e.g. accelerometer, angular rate sensor) disposed on a rotatable MEM stage. The MEM stage is provided with means for rotation about an axis substantially perpendicular to the sense axis of the MEM sensor. The rotation means additionally provides for positioning the sense axis of the sensor at two or more predetermined rotational positions. Means are provided for electrically accessing the MEM sensor (i.e. communicating input and output signals between a sensor and external control and/or measurement circuitry) at each position of the sensor.

Under static operating conditions, where the body to which the sensor is attached is not in motion, sensor output can be measured in a multiple of sensor positions, for example, an initial position and a position where the integral MEM stage is rotated by 180 degrees from the initial position. A comparison of the sensor output at the initial position and the output of the sensor at a rotated position allows for a determination of the bias error in the sensor's output. Bias error determination can be accomplished by sum-differencing computations based on a sensor's output in the initial and rotated positions. The bias error can then be accounted for in subsequent inertial calculations, for example, during dynamic operation of the sensor where the body to which the sensor is attached is moving, providing an improved sense accuracy for the MEM inertial sensor of the present invention.

The foregoing discussion concerns the use of a rotation capability of a MEM inertial sensor to determine a sensor's bias under a static operating condition of the sensor. Under a dynamic operating condition of the sensor, where the body to which the sensor is attached is moving, it may not be possible to directly determine the bias error because the bias error can be obscured by a dynamic input to the sensor (i.e. a sensed acceleration or rotation rate). However, the present invention additionally provides a method for bias error compensation of a sensor under a dynamic operating condition. While a MEM inertial sensor is operated under dynamic conditions, measurements of a sensor's output are taken at multiple rotational positions (for example at 0 degrees and 180 degrees) repeatedly over time, while the sensor is under dynamic operating conditions. For a sensor under a dynamic operating condition, the measurement of the sensor's output in the initial and the rotated positions can alternately contain positive and negative contributions due to the bias of the sensor. Inertial calculations based on the measurements of the sensor's output operating under dynamic conditions, can therefore also contain alternately positive and negative errors, due to the alternately positive and negative contributions of the sensor's bias, to the measured output of the sensor. Under a dynamic operating condition, errors in the inertial calculations due to alternately positive and negative contributions from the bias in a sensor's measured outputs are accumulated over time, and tend to average out, thus mitigating their aggregate effect providing an improved sense accuracy for a MEM inertial sensor of the present invention, under dynamic operating conditions.

An inertial measurement unit (IMU) according to the present invention can comprise a plurality of independently rotatably MEM inertial sensors (i.e. accelerometers and angular rate sensors. Measurements of the outputs of a plurality of sense elements, allows inertial calculations to be made along orthogonal axes by geometric summation methods. An IMU according to the present invention can comprise any number of independently rotatable MEM inertial sensors, where the number of independently rotatable sensors is greater than the number of orthogonal axes along which inertial calculations are to be made.

For example, where inertial calculations are to be made along three orthogonal axes, an IMU according to the present invention can comprise four independently rotatable MEM sensors. This can be accomplished in the present example by placing one independently rotatable MEM sensor on each of the four sides of a pyramidal base. In this example embodiment, the measured outputs from any three of the four sensors can be utilized to perform inertial calculations, by geometric summation of the three measured outputs, along the three orthogonal axes of the pyramidal base. For the present example, it can also be shown that inertial calculations can be performed for any coordinate axis system of interest, where the coordinate axes of interest may be displaced from the coordinate axes lying along the orthogonal axes of the pyramidal base.

In the present example, the measured outputs of any three of the four sensors are sufficient to perform inertial calculations along the three coordinate axes of interest. The output of the fourth sensor is not needed to perform the inertial calculations, and the fourth sensor can be in a transitional state, where the fourth sensor is rotatably transitioning from a first predetermined position, to a second predetermined position, for example where the second position is rotated 180 degrees from the first position.

Where the example IMU is undergoing static or dynamic operating conditions, measurements of the outputs of any three of the MEM sensors is sufficient to allow inertial calculations to be performed, continuously over time, for a body to which the IMU may be attached, while the fourth sensor can be rotatably transitioning from a first position to a second, rotated position. Once a sensor has completed transitioning between positions, it's output is measured and utilized in subsequent inertial calculations. In this example embodiment, at any given time, measurements of the outputs of three sensors are used in inertial calculations while a fourth sensor is undergoing a rotational transition. Once a sensor has completed a rotational transition, a new sensor is selected for rotation and the outputs of the remaining three sensors are measured. Sequentially selecting a different sensor for rotation while using the measured outputs of the remaining three non-rotating sensors for performing inertial calculations, allows the inertial calculations to be performed continuously through time. This embodiment of the present invention provides that the effects due to bias error in the inertial calculations are mitigated over time, by the accumulation in the inertial calculations of both positive and negative effects of bias error arising from alternately measuring each sensors output, in positions rotated 180 degrees apart. An embodiment of the present invention, an IMU comprising a plurality of MEM inertial sensors with integral rotational means, provides an IMU having improved sense accuracy under both static or dynamic operating conditions.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

Figure 1:
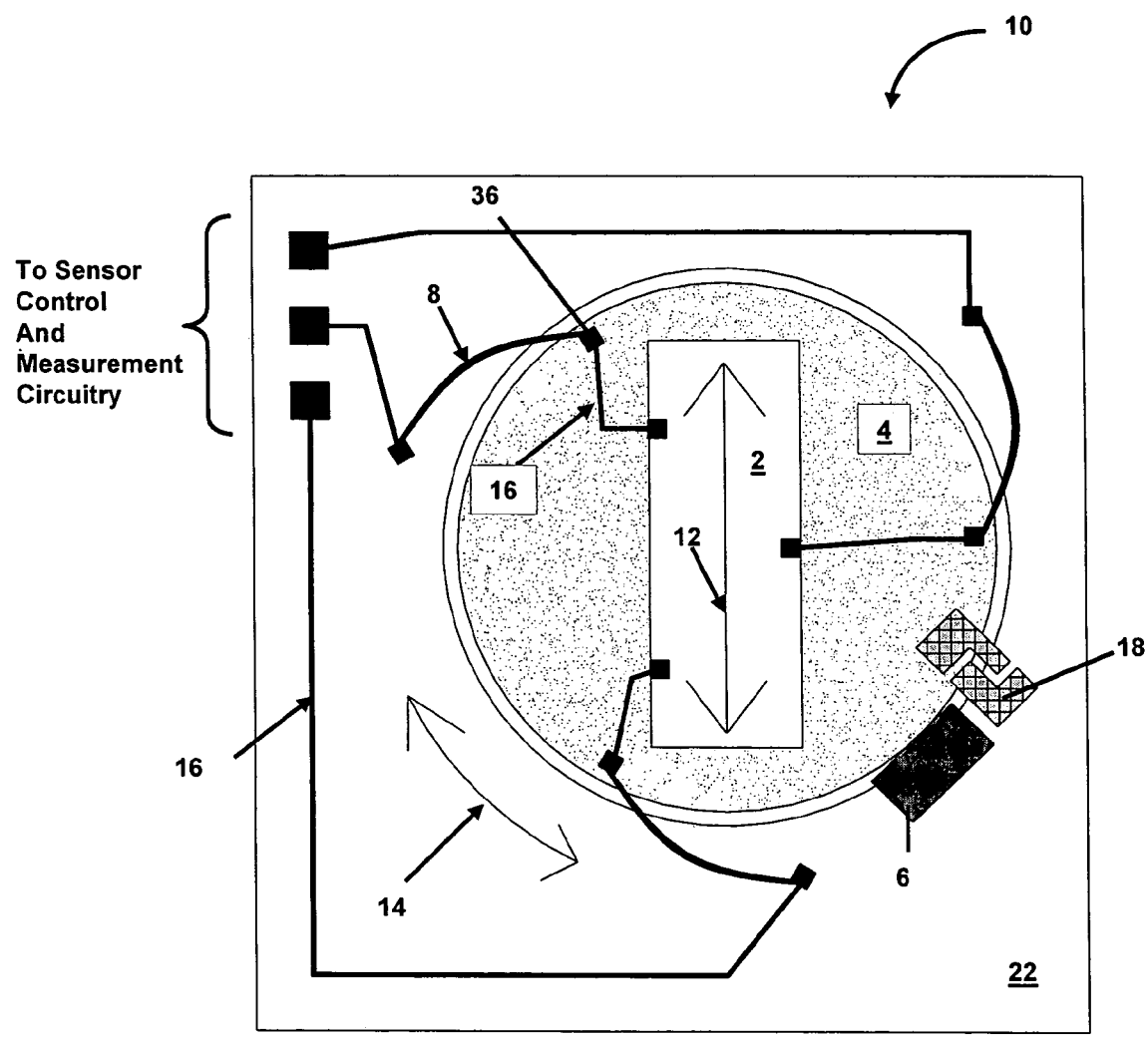
FIG. 1 shows a schematic plan view of a first embodiment of a MEM inertial sensor with integral rotational means, according to the present invention.

FIG. 1 is a schematic plan view of a first embodiment of a MEM inertial sensor 10 according to the present invention. The micromechanical inertial sensor 10, comprises a base 22 providing mechanical support for a rotatable micromechanical stage 4. A MEM inertial sensing element 2, having an inertial sense axis 12 is disposed on stage 4. An actuator 6 is operatively coupled to micromechanical stage 4, and rotates stage 4 about a rotational axis that is substantially perpendicular to sense axis 12 of sense element 2 (i.e. about an axis extending out of the plane of FIG. 1) and in the rotational direction as indicated by the arc 14.

Actuator 6 for rotating the stage 4 may further include mechanical stops 18, or indexing gears, latches or the like for orienting and positioning stage 4, at known rotational positions. Actuator 6 for rotating micromechanical stage 4 can comprise an electrostatic actuator, an electromagnetic actuator, a shape memory alloy actuator, a phase change based actuator, a piezoelectric actuator or a thermal actuator. The actuator 6 can be mechanically coupled to stage 4 by gears, ratchets, indexing pawls, etc. Sense element drive signals and output signals are communicated between sense element 2 and control and measurement circuitry (not shown) by electrical access means comprising a rotatable electrical connection 8 that interconnects electrical conductors 16 on the base 22 with electrical conductors 17 on the stage 4. Electrical conductors 17 on stage 4 are electrically connected to the input and output connections 34 of the sense element 2. The rotatable electrical connection 8 can comprise compliant electrical conductors, momentary electrical contacts, electrical contactors, sliding electrical contacts or relay based electrical contacts. Electrical conductors 16 on the base 22 can be provided with conductive pads 35, and electrical conductors 17 on stage 4 can be provided with conductive pads 36, at their respective connection points to the rotatable electrical connection 8.

An example of a MEM inertial sense element 2 that may be utilized in the practice of the present invention is described in U.S. Pat. No. 6,393,913 to Dyck et. al., which is incorporated herein by reference. Micromechanical sense element 2 may comprise an accelerometer or an angular rate sensor (e.g. a gyroscope or gyro). Examples of a MEM actuator 6, for providing a rotational force to the micromechanical stage 4, that can be used in the practice of the present invention, may comprise one or more electrostatic actuators, thermal actuators, or electromagnetic actuators, as are known in the art. See for example U.S. Pat. Nos.; 6,313,562; 5,959,376; 5,631,514; 5,917,260 which are incorporated herein by reference. As previously mentioned, actuator 6 can be operatively coupled to rotate the stage 4 using one or more gears, ratchet pawls etc. Gear teeth can be formed about the periphery of the stage 4, for applications where actuator 6 is coupled to stage 4 by gears.

A method of the present invention that can be used to compensate for the bias errors in the output of inertial sensor 10, comprises measuring the output of the sense element 2 at multiple rotational positions of stage 4 (e.g. 0 and 180 degrees) and then applying geometric sum-differencing methods to the measured outputs, to determine the contribution of sensor bias to the outputs. While outputs measured at multiple sensor positions may be used and geometrically summed, the following example considers the case where two rotational positions are used, angularly displaced by 180 degrees from each other.

Where sense element 2 is positioned in an initial position (herein defined as 0 degrees), and experiencing a force substantially along sense axis 12, a first measurement M1 of the sensor output is obtained which is given by:

$$M1 \text{ (first measurement)} = F_{in} + \text{Bias}$$

Where $F_{in}$ is the output of sense element 2 due to the component of the force acting along sense axis 12, and "Bias" is a error due to bias in the output of sense element 2. After rotating stage 4, and hence sense element 2, through an angle of 180 degrees and re-measuring the output of sense element 2 a second measurement M2 is obtained which is given by:

$$M2 \text{ (second measurement)} = -F_{in} + \text{Bias}$$

Where $-F_{in}$ is the output of sense element 2 due to the force and +Bias is the bias error of the sense element in the 180 degree rotated position. The Bias error can be calculated from the two measurements of the output of sense element 2 as:

$$\text{Bias} = (M1 + M2)/2$$

And the actual response Mc of sense element 2 due to the force is given by:

$$Mc = F_{in} = (M1 - M2)/2.$$

Mc equals the calculated inertial measurement of sense element 2, compensated for the bias error in the output of sense element 2.

Figure 2:
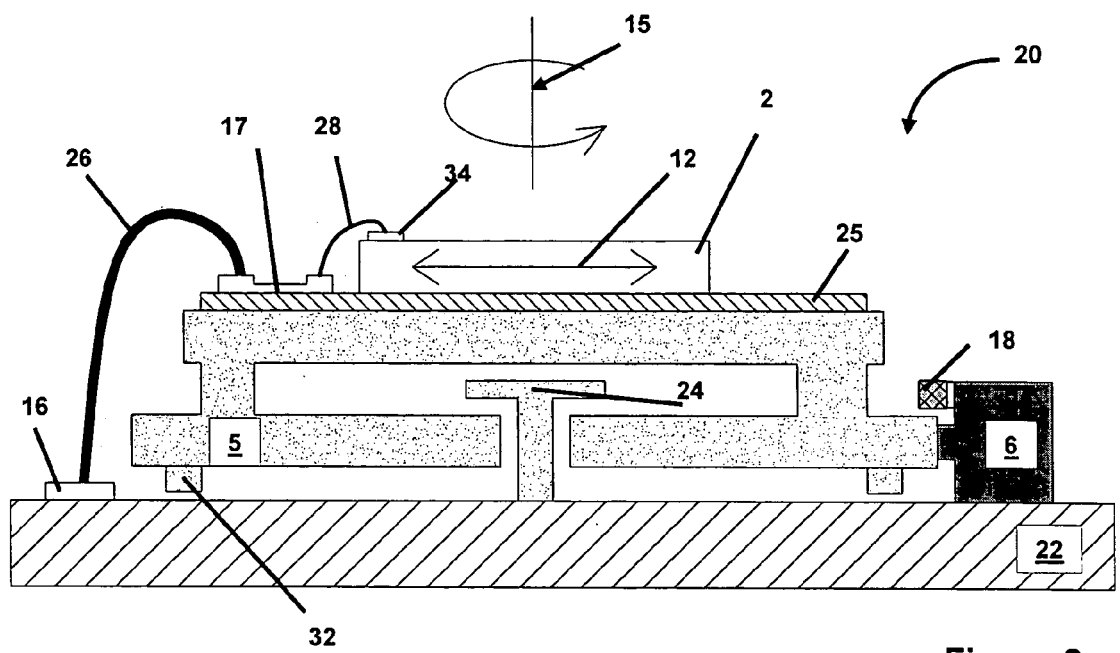
FIG. 2 shows a schematic cross section view of a second embodiment of a MEM inertial sensor with integral rotational means according to the present invention that comprises a first LIGA stage.

FIG. 2 shows a schematic cross section view of a second embodiment of a MEM inertial sensor 20 with integral rotational means according to the present invention. The MEM inertial sensor 20 comprises a base 22 providing mechanical support for a rotatable micromechanical stage 5. Stage 5 can be fabricated using LIGA technologies. A MEM inertial sensing element 2, having an inertial sense axis 12 is disposed on stage 5. Stage 5 is rotatably affixed to base 22 by a hub 24. An actuator 6 is operatively coupled to micromechanical stage 5, and rotates stage 5 about a rotational axis 15 which is substantially perpendicular to the sense axis 12 of the sense element 2. Actuator 6 for rotating micromechanical stage 5 can comprise an electrostatic actuator, an electromagnetic actuator, a shape memory alloy actuator, a phase change based actuator, a piezoelectric actuator or a thermal actuator. The actuator 6 can be mechanically coupled to rotate stage 5 through gears, ratchets, indexing pawls, etc. Actuator 6 for rotating the stage 5 may further include mechanical stops 18, or indexing gears, latches or the like for orienting and positioning stage 5, at known rotational positions.

Sense element drive signals and output signals are communicated between sense element 2 and control and measurement circuitry (not shown) by electrical access means including compliant fine gauge wires 26 connecting electrical conductors 16 on the base 22 with electrical conductors 17 on the stage 5, and electrical conductors 28 connecting the electrical conductors 17 on the stage 5 to the sense element inputs and outputs 34. Electrical conductors 28 can comprise wirebonds (e.g. aluminum, gold or nickel wire) connecting input and outputs 34 of sense element 2 to conductors 17 disposed on the surface of stage 5.

The stage 5 may be formed with one or more levels of electrodeposited metal (e.g. two levels are shown in FIG. 2) to allow for placement of the sensing element 2 on the approximate center of the stage 5, directly above hub 24. Alternatively, stage 5 can be fabricated from one level of electrodeposited metal with the sense element 2 located off-center of the stage, adjacent to the hub 24. Where the stage 5 is fabricated of a conductive material (e.g. an electrodeposited metal such as nickel, or nickel-iron alloy, copper, or gold, etc.) an insulating layer 25 will generally be disposed between the stage 5 and conductors 17 disposed on the stage 5, as shown in FIG. 2. The insulating layer 25 can comprise for example, a metal oxide, a ceramic, a glass, silicon dioxide, silicon nitride, a polymeric material, etc. Raised bosses 32 can be provided on an underside of the stage 5 to provide a slideable contact between the stage 5 and the underlying base 22.

Means 6 for rotating the stage 5 may include mechanical stops 18, indexing gears, latches or other means for orienting or positioning stage 5, at known rotational angles. The MEM sensing element 2 can be in the form of a bare device die or a packaged component, and can be attached to the stage 5 by and adhesive or a solder. Base 22 is generally planar and can comprise an electrodeposited metal, or a printed wiring board, or a ceramic or polymeric material, or a silicon or a glass substrate.

Figure 3:
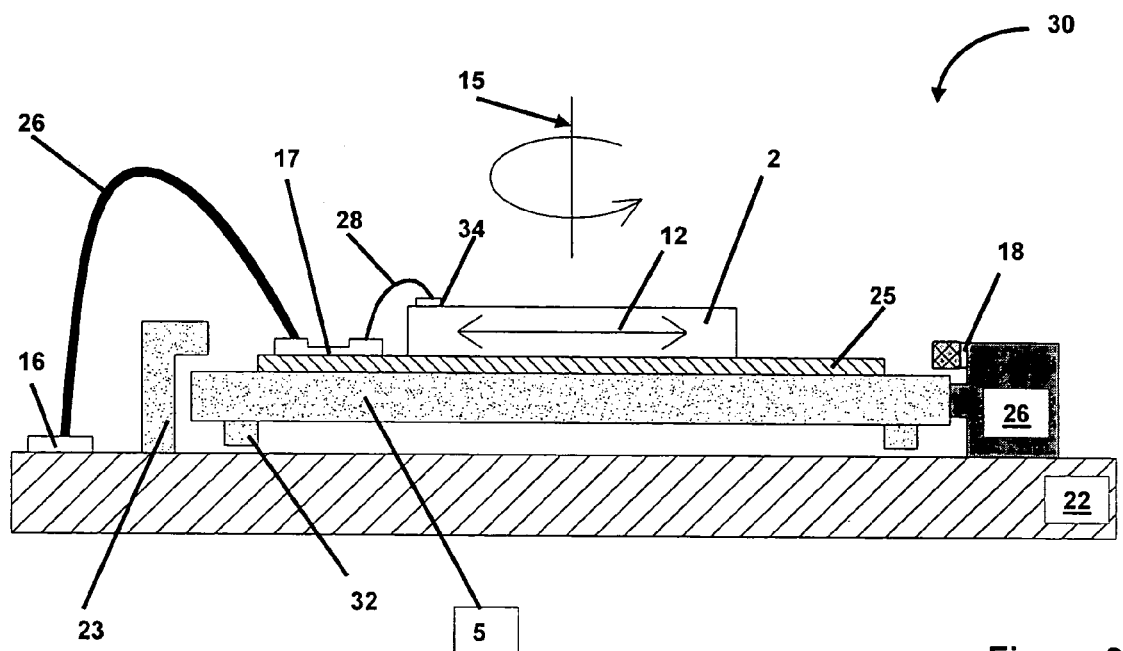
FIG. 3 shows a schematic cross section view of a third embodiment of a MEM inertial sensor with integral rotational means according to the present invention, that comprises a second LIGA stage.

FIG. 3 shows a schematic cross section view of a third embodiment of a MEM inertial sensor 30 with integral rotational means according to the present invention. The MEM inertial sensor 30 comprises a base 22 providing mechanical support for a rotatable micromechanical stage 5. Stage 5 can be fabricated using LIGA technologies. A MEM inertial sensing element 2, having an inertial sense axis 12 is disposed on stage 5. Stage 5 is rotatably constrained to base 22 by restraining clips 23, that slideably engage stage 5. Restraining clips 23 are attached to base 22 and are spaced about the perimeter of stage 5 (e.g. typically at three locations). An actuator 6 is operatively coupled to micromechanical stage 5, and rotates stage 5 about a rotational axis 15 which is substantially perpendicular to the sense axis 12 of the sense element 2. Actuator 6 for rotating micromechanical stage 5 can comprise an electrostatic actuator, an electromagnetic actuator, a shape memory alloy actuator, a phase change based actuator, a piezoelectric actuator or a thermal actuator. The actuator 6 can be mechanically coupled to rotate stage 5 through gears, ratchets, indexing pawls, etc. Actuator 6 for rotating the stage 5 may further include mechanical stops 18, or indexing gears, latches or the like for orienting and positioning stage 5, at known rotational positions.

Sense element drive signals and output signals are communicated between sense element 2 and control and measurement circuitry (not shown) by electrical access means including compliant fine gauge wires 26 connecting electrical conductors 16 on the base 22 with electrical conductors 17 on the stage 5, and electrical conductors 28 connecting the electrical conductors 17 on the stage 5 to the sense element inputs and outputs 34. Electrical conductors 28 can comprise wirebonds (e.g. aluminum, gold or nickel wire) connecting input and outputs 34 of sense element 2 to conductors 17 disposed on the surface of stage 5.

Where the stage 5 is fabricated of a conductive material (e.g. an electrodeposited metal such as nickel, or nickel-iron alloy, copper, or gold, etc.) an insulating layer 25 will generally be disposed between the stage 5 and conductors 17 disposed on the stage 5, as shown in FIG. 3. The insulating layer 25 can comprise for example, a metal oxide, a ceramic, a glass, silicon dioxide, silicon nitride, a polymeric material, etc. Raised bosses 32 can be provided on an underside of the stage 5 to provide a slideable contact between the stage 5 and the underlying base 22.

Means 6 for rotating the stage 5 may include mechanical stops 18, indexing gears, latches or other means for orienting or positioning stage 5, at known rotational angles. The MEM sensing element 2 can be in the form of a bare device die or a packaged component, and can be attached to the stage 5 by and adhesive or a solder. Base 22 is generally planar and can comprise an electrodeposited metal, or a printed wiring board, or a ceramic or polymeric material, or a silicon or a glass substrate.

Figure 4:
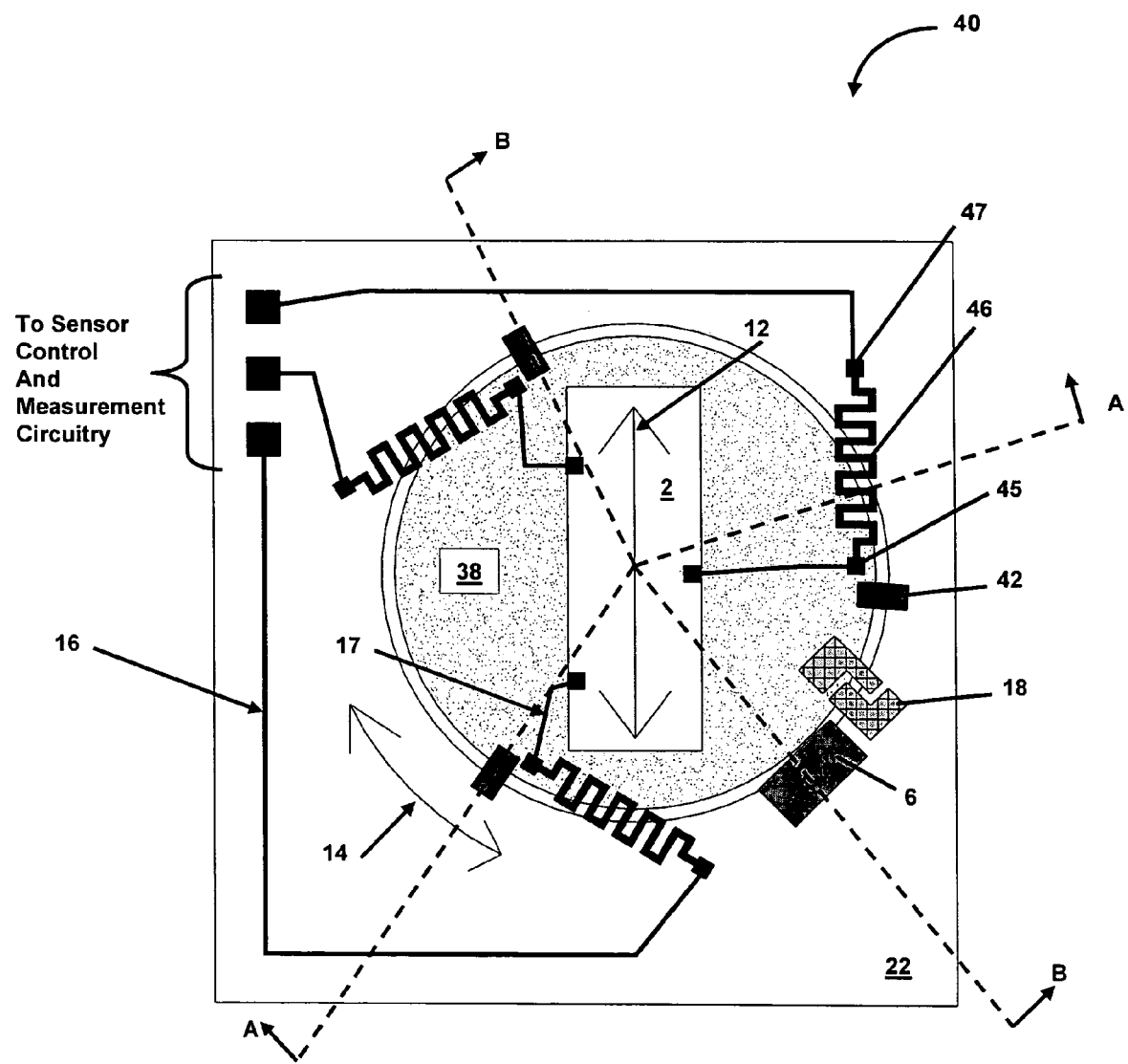
FIG. 4 shows a schematic plan view of a fourth embodiment of a MEM inertial sensor with integral rotational means according to the present invention, that comprises compliant electrical access means.

FIG. 4 is a schematic plan view of a fourth embodiment of a MEM inertial sensor with integral rotational means according to the present invention. The micromechanical inertial sensor 40 comprises a base 22 providing mechanical support for a rotatable micromechanical stage 38. A MEM inertial sensing element 2, having an inertial sense axis 12 is disposed on stage 38. An actuator 6 is operatively coupled to micromechanical stage 38, and rotates stage 38 about a rotational axis that is substantially perpendicular to sense axis 12 of sense element 2 (i.e. about an axis extending out of the plane of FIG. 4) and in the rotational direction as indicated by the arc 14.

Stage 38 is rotatably constrained to base 22 by restraining guides 42. Guides 42 are located around the perimeter of stage 38, for example typically at three locations evenly spaced about the perimeter of stage 38. Actuator 6 for rotating micromechanical stage 38 can comprise an electrostatic actuator, an electromagnetic actuator, a shape memory alloy actuator, a phase change based actuator, a piezoelectric actuator or a thermal actuator. The actuator 6 can be mechanically coupled to rotate stage 38 through gears, ratchets, indexing pawls, etc. Actuator 6 for rotating the stage 38 may further include mechanical stops 18, or indexing gears, latches or the like for orienting and positioning stage 38, at known rotational positions.

Sense element drive signals and output signals are communicated between sense element 2 and control and measurement circuitry (not shown) by electrical access means including compliant silicon conductors 46 connecting electrical conductors 16 disposed on the base 22 with electrical conductors 17 disposed on the stage 38. Compliant silicon conductors 46 are spatially suspended above the surfaces of base 22 and stage 38, and are supported at each end by anchor posts 45 and 47. Compliant silicon conductors 46 can be arranged in a spiral, a zigzag, a wound spring or a meandering configuration that is capable of extension, compression, flexure, twist, or torsion.

In this embodiment of the present invention, a silicon on insulator (SOI) wafer can be used as the starting substrate for the fabrication of MEM inertial sensor 40, using processes common to bulk and surface micromachining methods. SOI wafers typically comprise a base silicon wafer, and an epitaxially grown silicon layer separated by an insulating layer (e.g. typically silicon dioxide). A clearance "gap" 54 spatially separating the rotating stage 38 and base 22 can be photolithographically defined and etched by chemical or dry plasma etching process through the epitaxial silicon layer of the SOI wafer. After the gap 54, defining the perimeter of stage 38, has been etched through the epitaxial silicon layer, the gap 54 can be filled with a sacrificial layer such as silicon dioxide deposited by chemical vapor deposition. After filling the gap 54 with sacrificial material, the surface of the SOI wafer can be planarized by mechanical or chemical mechanical polishing methods as known in the art. Surface micromachining processes can then be applied to the planarized SOI wafer to fabricate the elements of the MEM sensor 40 on the surface of the SOI wafer.

Figure 5:
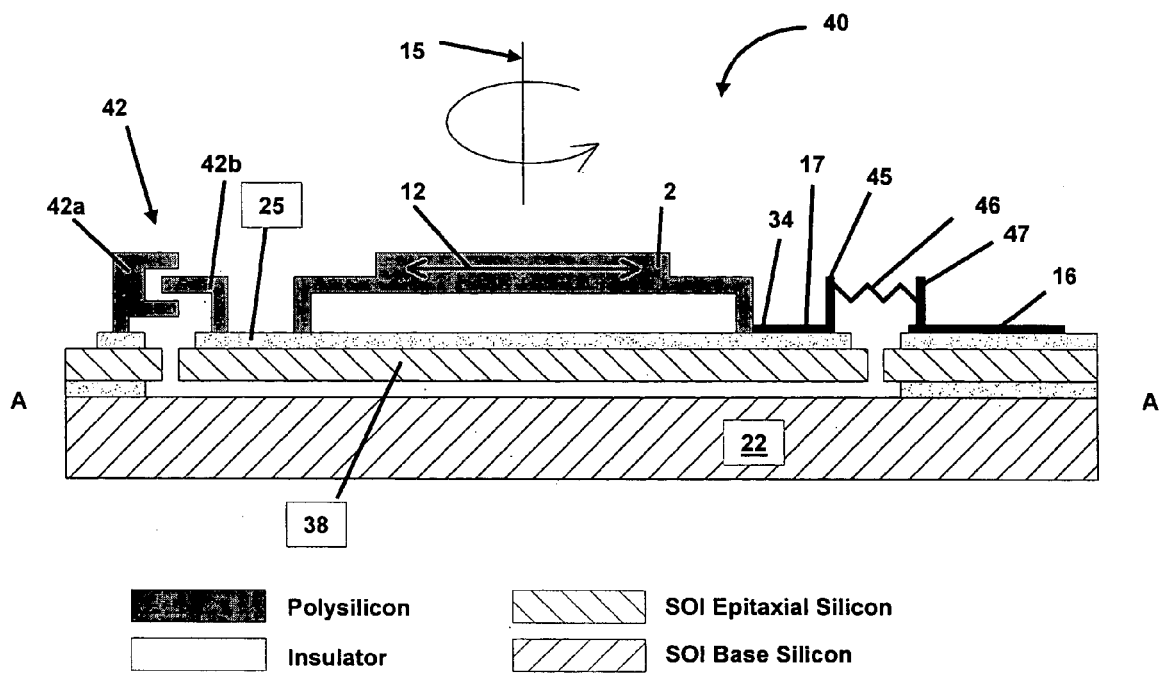
FIG. 5 shows a schematic cross section view along the section A—A in FIG. 4, of the fourth embodiment of a MEM inertial sensor with integral rotational means, according to the present invention.

FIG. 5 shows a schematic cross section view of the fourth embodiment according to the present invention from FIG. 4, as viewed along the section line A—A. The micromechanical inertial sensor 40 comprises a base 22 providing mechanical support for a rotatable micromechanical stage 38. A MEM inertial sensing element 2, having an inertial sense axis 12 is disposed on stage 38. Stage 38 is rotatably constrained to base 22 by restraining guides 42. Guides 42 can further comprise a guide portion 42a attached to base 22, and a guide portion 42b attached to stage 38, and portions 42a and 42b being slideably engaged. Guides 42 are spaced about the perimeter of stage 38 (e.g. typically at three locations).

Sense element drive signals and output signals are communicated between sense element 2 and control and measurement circuitry (not shown) by electrical access means including compliant silicon conductors 46 connecting electrical conductors 16 disposed on the base 22 with electrical conductors 17 disposed on the stage 38. Compliant silicon conductors 46 are spatially suspended above the surface of base 22 and stage 38, and are supported at one end by an anchor post 45 attached to the stage 38 and at the other end by an anchor post 47 attached to the base. Compliant silicon conductors 46 can be arranged in a spiral, a zigzag, a wound spring or a meandering configuration that is capable of extension, compression, flexure, twist, or torsion. The compliant silicon conductors 46 extend and contract in response to the rotation of stage 38 while maintaining electrical connection between electrical conductors 16 disposed on base 22 and electrical conductors 17 disposed on stage 38. An insulating layer 25 is typically disposed between conductors 17 and 16, and the upper surfaces of the stage 38 and base 22 respectively.

Guides 42 and compliant silicon conductors 46 can comprise polysilicon layers created by repetitive deposition and photolithographic definition and etching steps as practiced in surface micromachining. Insulating layer 25 can comprise a silicon oxide, a silicon nitride, a silicon oxy-nitride, a polymer or a metal oxide. Conductors 16 and 17 can comprise doped silicon, doped polycrystalline silicon or metals. Micromechanical sense element 2 can be formed by surface micromachining processes applied directly to the surface of stage 38, or alternatively MEM sense element 2 can comprise a separate device (e.g. a die) attached to the surface of rotatable stage 38 by an adhesives or a solder.

Figure 6:
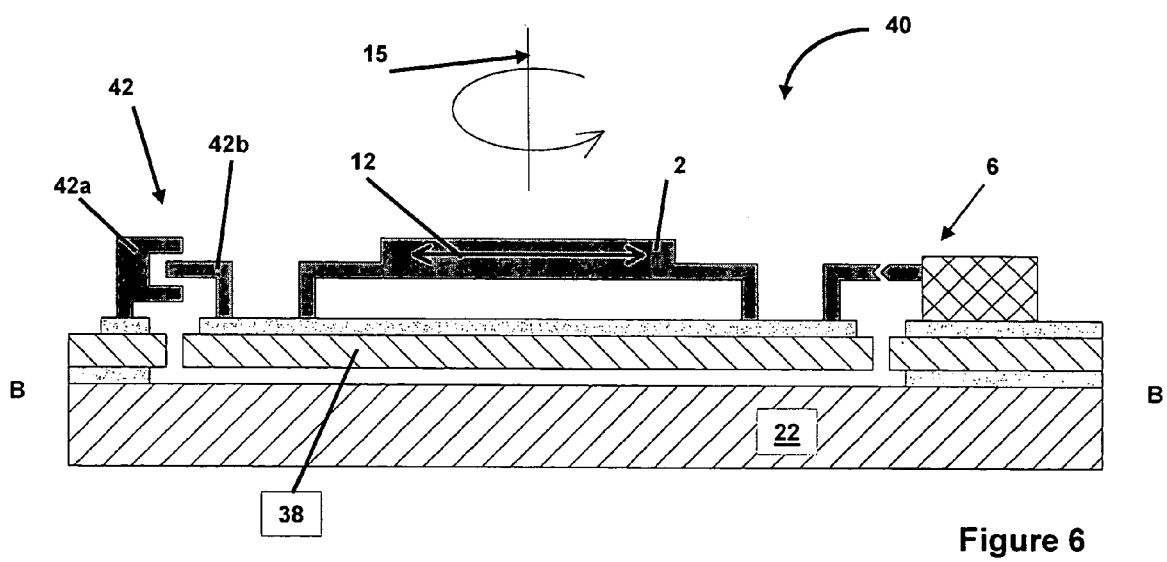
FIG. 6 shows a schematic cross section view along the section B—B in FIG. 4, of the fourth embodiment of a MEM inertial sensor with integral rotational means, according to the present invention.

FIG. 6 shows a schematic cross section view of the fourth embodiment according to the present invention from FIG. 4, as viewed along the section line B—B. The micromechanical inertial sensor 40 comprises a base 22 providing mechanical support for a rotatable micromechanical stage 38. A MEM inertial sensing element 2, having an inertial sense axis 12 is disposed on stage 38. Stage 38 is rotatably constrained to base 22 by restraining guides 42. Guides 42 can further comprise a guide portion 42a attached to base 22, and a guide portion 42b attached to stage 38, with portions 42a and 42b being slideably engaged. Guides 42 are spaced about the perimeter of stage 38 (e.g. typically at three locations). An actuator 6 is operatively coupled to micromechanical stage 38, and rotates stage 38 about a rotational axis 15 that is substantially perpendicular to sense axis 12 of sense element 2.

Actuator 6 for rotating micromechanical stage 38 can comprise an electrostatic actuator, an electromagnetic actuator, a shape memory alloy actuator, a phase change based actuator, a piezoelectric actuator or a thermal actuator. The actuator 6 can be mechanically coupled to rotate stage 38 through gears, ratchets, indexing pawls, etc. Actuator 6 for rotating the stage 38 may further include mechanical stops, or indexing gears, latches or the like for orienting and positioning stage 38, at known rotational positions.

Figure 7:
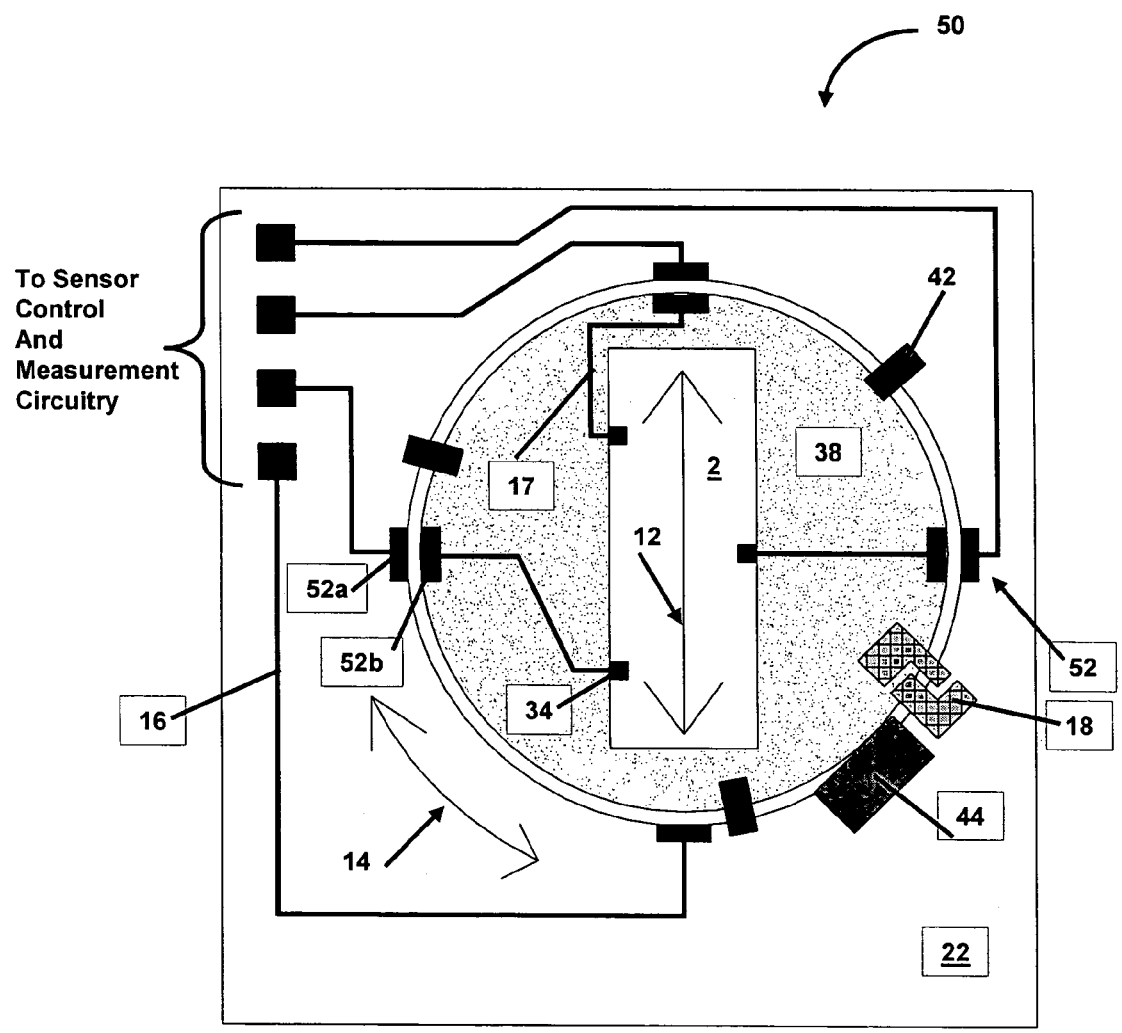
FIG. 7 shows a schematic plan view of a fifth embodiment of a MEM inertial sensor with integral rotation means according to the present invention, that comprises mechanically contacting electrical access means.

FIG. 7 shows a schematic plan view of a fifth embodiment of a MEM inertial sensor with integral rotational means, according to the present invention. The micromechanical inertial sensor 50 comprises a base 22 providing mechanical support for a rotatable micromechanical stage 38. A MEM inertial sensing element 2, having an inertial sense axis 12 is disposed on stage 38. An actuator 6 is operatively coupled to micromechanical stage 38, and rotates stage 38 about a rotational axis that is substantially perpendicular to sense axis 12 of sense element 2 (i.e. about an axis extending out of the plane of FIG. 4) and in the rotational direction as indicated by the arc 14. Stage 38 is rotatably constrained to base 22 by restraining guides 42. Guides 42 are located around the perimeter of stage 38, for example, typically at three locations evenly spaced about the perimeter of stage 38. Actuator 6 for rotating micromechanical stage 38 can comprise an electrostatic actuator, an electromagnetic actuator, a shape memory alloy actuator, a phase change based actuator, a piezoelectric actuator or a thermal actuator. The actuator 6 can be mechanically coupled to rotate stage 38 through gears, ratchets, indexing pawls, etc. Actuator 6 for rotating the stage 38 may further include mechanical stops 18, or indexing gears, latches or the like for orienting and positioning stage 38, at known rotational positions.

Sense element drive signals and output signals are communicated between sense element 2 and control and measurement circuitry (not shown) by electrical access means including micromechanical contactors 52 placed about the perimeter of stage 3. Micromechanical contactors 52 can further comprise a contactor portion 52*a* attached to the base 22, and a contactor portion 52*b* attached to the stage 38. Conductors 16 disposed on the base 22 are electrically connected to contactor portions 52*a* attached to the base 22. Conductors 17 disposed on the stage 38 are electrically connected to contactor portions 52*b* disposed on the stage 38. A micromechanical contactor 52 can comprise an electrostatic, an electromagnetic, a piezoelectric or a thermally actuated relay providing an electrical connection between contactor portions 52*a* and contactor portions 52*b*, at known rotational positions of the stage 38. Conductors 17 disposed on the stage 38 electrically interconnect the contactor portions 52*b* to the inputs and outputs 34 of sense element 2.

In the present embodiment according to the invention, actuator 6 rotates the stage 38 to a predetermined initial position where contactor portions 52*a* are aligned with contactor portions 52*b*, and an electrical connection is made between conductors 16 on the base 22 and electrical conductors 17 on the stage 38, whereat rotation of the stage 38 is halted and an electrical measurement of the sense element 2 output is made. Then actuator 6 rotates the stage to a second predetermined location (e.g. displaced by 180 degrees from the initial position) where contactor portions 52*a* are again aligned with contactor portions 52*b*, and an electrical connection is made between conductors 16 on the base 22 and electrical conductors 17 on the stage 38, whereat rotation of the stage 38 is halted and a second electrical measurement of the sense element 2 output is made. Comparison of the measured output of the sense element 2 in the initial position, and the measured output of sense element 2 in a position displaced 180 degrees from the initial position, allows for calculating the sensor bias by the methods described above.

Figure 8A:
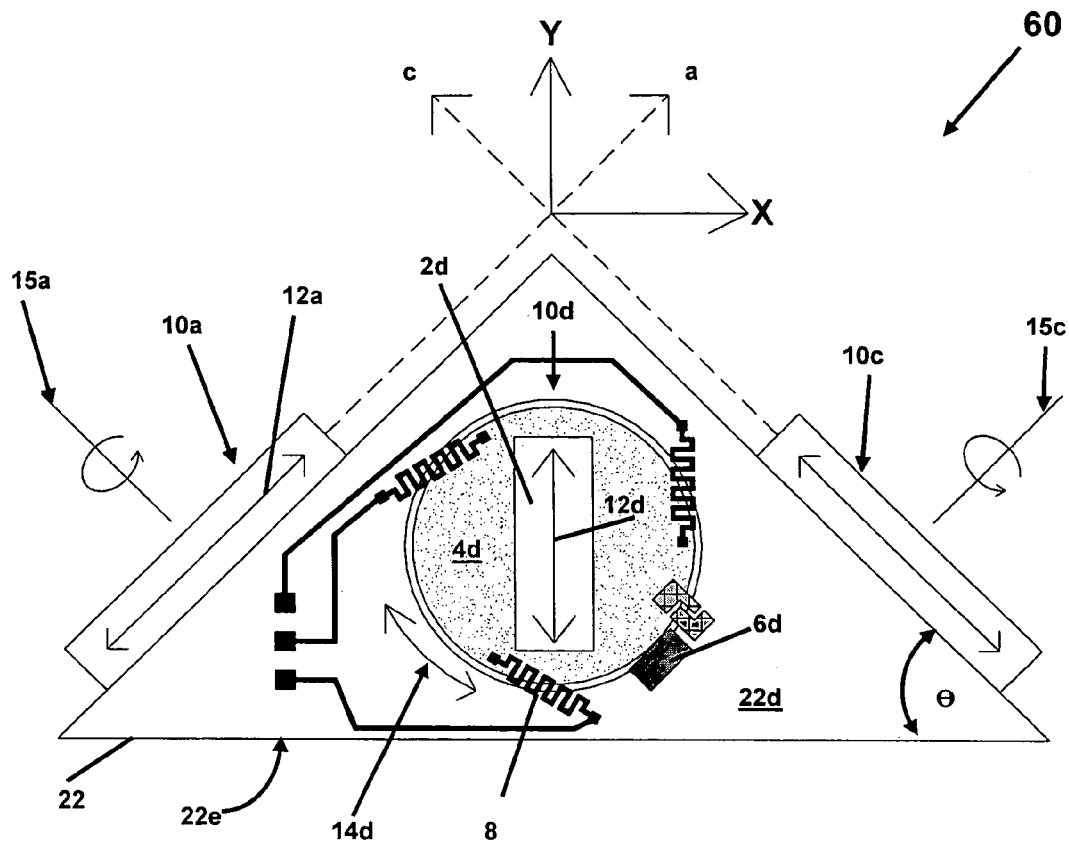
FIG. 8A shows a schematic elevation view of an IMU comprising a plurality of MEM inertial sensors having integral rotational means and, being disposed on a plurality of non-coplanar surfaces, according to the present invention.
Figure 8B:
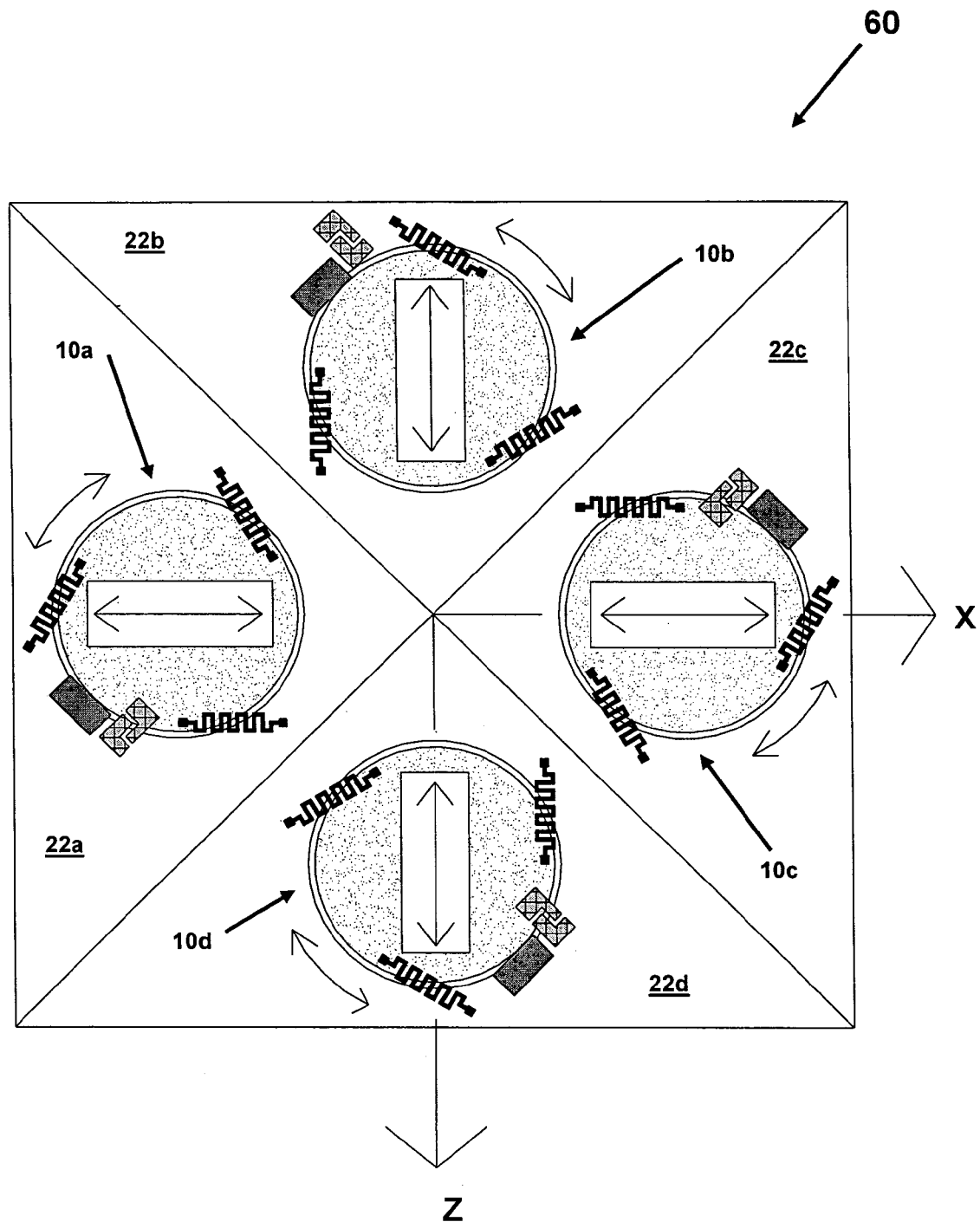
FIG. 8B shows a schematic plan view of an IMU comprising four inertial sensors having integral rotational means and, being disposed on four non-coplanar surfaces, according to the present invention.

FIGS. 8A and 8B show schematic elevation and schematic plan views respectively, of a sixth embodiment according to the present invention, an Inertial Measurement Unit (IMU) 60, comprising a plurality of MEM inertial sensors with integral rotational means. Inertial measurement unit 60 comprises a base 22 having four non-coplanar side surfaces 22 (*a–d*) arranged in a pyramidal geometry where each side makes an angle Θ with a bottom surface 22*e*. Four micromechanical inertial sensors 10 (*a–d*) comprising sense axes 12 (*a–d*) and independently rotatable stages 4 (*a–d*) are singly disposed on each of the four non-coplanar surfaces 22 (*a–d*). Each stage 4 (*a–d*) is rotatable about an axis 15 (*a–d*) lying substantially along a normal to the surface 22 (*a–d*) upon which each sensor is disposed. The axis of rotation 15 (*a–d*) of each stage is substantially perpendicular to the sense axis 12 (*a–d*) of each sensor 10 (*a–d*). An actuator 6 (*a–d*) is operatively coupled to each of the micromechanical stages 4 (*a–d*), which provides for independently rotating each stage 4 (*a–d*), between at least two predetermined rotational positions. Sense element drive signals and output signals are communicated between sense elements 2 (*a–d*) and control and measurement circuitry (not shown) by electrical access means comprising rotatable electrical connections 8. For simplicity of illustration in FIGS. 8A and 8B, electrical interconnections between the sense element 2 and the external control and measurement circuitry are not shown, having been described in detail above.

As shown in FIGS. 8A and 8B, X, Y, and Z are the reference axes of the orthogonal coordinate system of interest, for which inertial calculations are to be made. The sense axes 12 (*a–d*) can be represented by the unit vectors (*a–d*) rotated from the reference axes by the angle Θ. By the methods presented below, it can be shown that for this example embodiment of the invention, the inertial measurements in the reference coordinates X, Y, and Z can be calculated from the measured outputs of any three of the four sense elements 2 (*a–d*). This allows that at any point in time during either static or dynamic operation of the IMU 60, inertial measurements can be calculated for a body to with the IMU is attached by measuring the outputs of any three of the four sense elements 2 (*a–d*) while the output of the fourth sense element is not measured, and the stage of fourth sensor can be rotating between pre-determined positions, as measurements of the outputs of the other three sense elements on non-rotating stages, are made. By sequentially selecting and rotating each sense element through an angle on the order of 180 degrees, while measuring the other three non-rotating sense element outputs, the bias error of each sensor can be dynamically compensated for over time, by the methods presented below.

Four independently rotatable micromechanical sensors 10 (*a–d*) comprise an IMU 60 in this embodiment of the invention, but any number of sensors being at least two is anticipated by the present invention. Each sensor 10 (*a–d*) is shown in FIGS. 8A and 8B to be singly disposed on a non-coplanar surface 22 (*a–d*), but alternatively, a multiple of sensors can be disposed on a given surfacer 22 (*a–d*). As shown in FIGS. 8A and 8B, each side surface 22 (*a–d*) makes an angle of Θ with the bottom 22*e* of base 22. Alternatively, each side surface 22 (*a–d*) could make an angle of Θ with the bottom 22*e* of base 22, greater than 0 and less than 90 degrees. The angle Θ is shown to be the same for each of the surfaces 22 (*a–d*) with respect to the bottom 22*e* of base 22, but this is not necessary to practicing the invention.

Referring to FIGS. 8A and 8B, the following describes a method for making inertial measurements of improved sensor accuracy, according to the present invention. The sense axes 12 (*a–d*) (i.e. the input axes) of sensors 10 (*a–d*) can be defined respectively by the unit vectors a, b, c, and d. The orthogonal axes in which inertial measurements are desired are X, Y and Z, with corresponding unit vectors i, j, and k. In this embodiment of the present invention, the angle Θ is set to 45 degrees for simplicity in the example calculations. The unit vectors a, b, c, and d for each sense element 2 (*a–d*) in an initial rotational position of each stage 4 (*a–d*), are related and given by the equations:

$$a=(i+j)/\sqrt{2},\ b=(j+k)/\sqrt{2},\ c=(-i+j)/\sqrt{2},\ d=(j-k)/\sqrt{2}$$

Thus any three of the equations relating the unit vectors a, b, c, and d, provides three equations and three unknowns. Therefore, if any three sensor outputs are measured, the three measured outputs can be used to calculate the three components of an inertial measurement in the X, Y, Z coordinates. This provides a method by which an inertial measurement may be obtained from three non-rotating sensors, while the sense axis of the fourth is being rotated.

In FIG. 8B, for an embodiment where sense element 12*a* is selected for bias compensation by rotation of stage 4*a*, and where sense elements 12 (*b–d*) remain in a non-rotating state, measurement of the outputs of the non-rotating sense elements 12 (*b–d*) in matrix notation are given by:

$$[b\ c\ d]=S[i\ j\ k]$$

where;

$$S=[0\ 1\ 1;\ -1\ 1\ 0;\ 0\ 1\ -1]/\sqrt{2}$$

and;

[i j k]=inverse(S)[b c d]

and;

inverse($S$)=[1 −2 1; 1 0 1; 1 0 −1]/$\sqrt{2}$

Therefore, if the three measurements of the outputs of sense element 12 (*b*, *c*, and *d*) are Mb, Mc and Md, the corresponding measurements in X, Y and Z coordinates are given by:

M=[Mb Mc Md] [b c d]=[Mb Mc Md]S[i j k]

and;

M=[(−Mc)×i+(Mb+Mc+Md)×j+(Mb−Md)×k]/$\sqrt{2}$

The desired inertial measurements in X, Y, and Z coordinates are therefore given by:

Mx=−Mc/$\sqrt{2}$, My=(Mb+Mc+Md)/$\sqrt{2}$, and Mz=(Mb−Md)/$\sqrt{2}$  Eqn. 1

It can be shown that any three of the measured sensor outputs Ma, Mb, Mc and Md may be used to calculate the three inertial measurement components Mx, My and Mz along the coordinate axes X, Y and Z.

After a sense element 12 (*a–d*) has been rotated about its sense axis (e.g. 180 degrees in this example embodiment) the sign of the sensors input is reversed in subsequent calculations. After rotation of sense element 12*a* through an angle of 180 degrees from its initial position, the unit input vector is now:

a=(−i−j)/$\sqrt{2}$

To continue the rotational sequence, sense element 12*b* can be selected for bias compensation by rotation while remaining sensors 12 (*a, c* and *d*) are fixed in a non-rotating state. A new S matrix is defined where;

[a c d]=S[i j k]

and;

$S$=[0 −1 −1; −1 1 0; 0 1 −1]/$\sqrt{2}$

Calculation of the desired inertial measurements Mx, My and Mz are made following the method described above, using the measured outputs of sensors 10 (*a, c* and *d*). The progression of selecting a sense element 12 (*a–d*) for rotation while remaining sense elements are maintained in their initial positions can be illustrated in Table 1:

TABLE 1

Sequencing of sense element (12a through 12d) selected for rotation, while remaining sense elements are maintained in a non-rotating state.

| Sense element being measured | b, c, d | −a, c, d | −a, −b, d | −a, −b, −c | −b, −c, −d | a, −c, −d | a, b, −d | a, b, c |
|---|---|---|---|---|---|---|---|---|
| Sense element being rotated | a | b | c | d | a | b | c | d |
| Time | → | → | → | → | → | → | → | → |

There are eight unique sense element states as shown in Table 1 (counting the effects of sign changes) and each state has a unique S matrix with which the equivalent measurements in the X, Y and Z coordinate system may be calculated as in Eqn. 1 above. Over time, the cumulative effect of sense element axis reversal (rotation about 180 degrees) will be to mitigate the effect of sensor bias errors on the inertial measurement.

Figure 9:
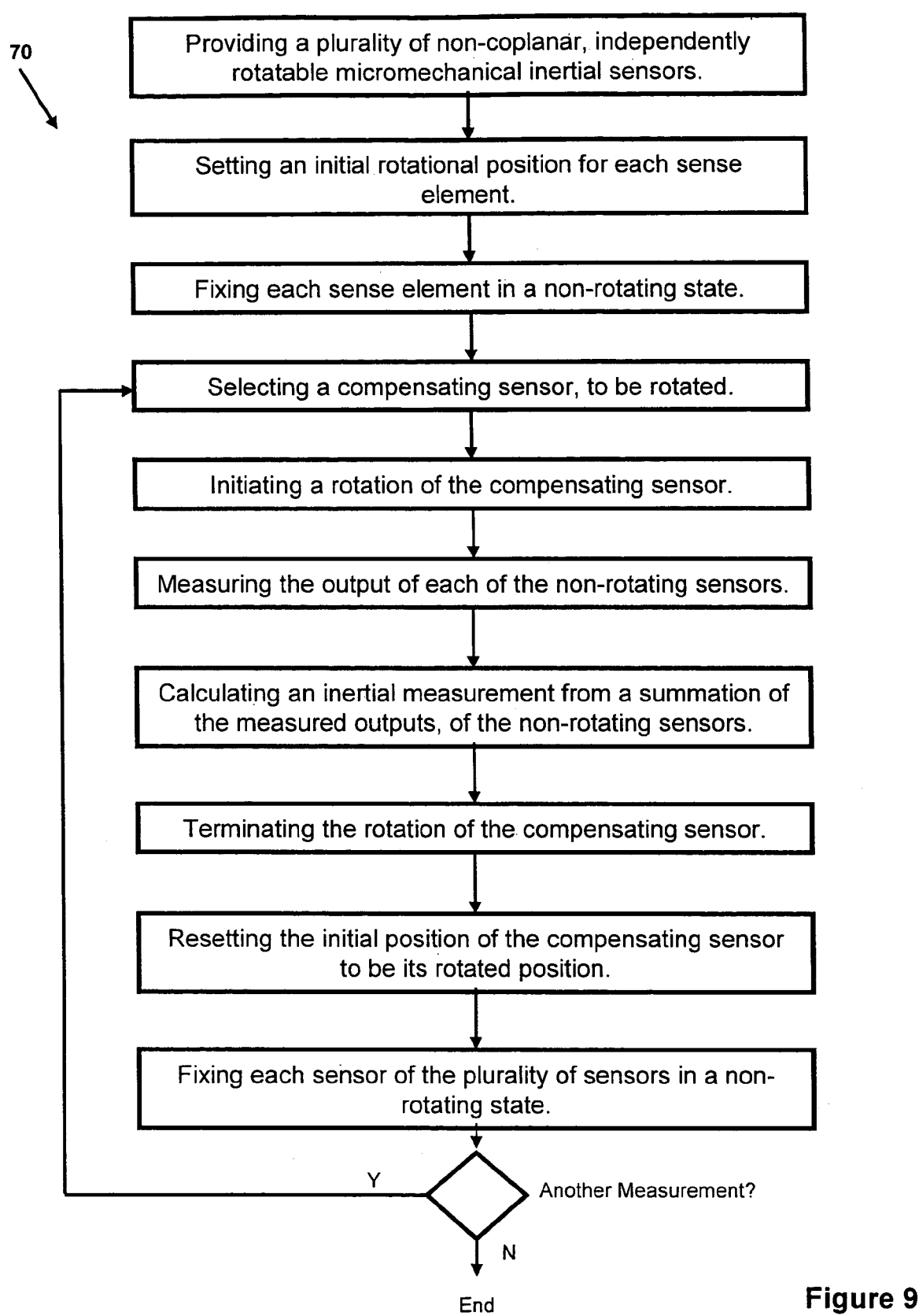
FIG. 9 is a block diagram illustrating the steps for making a dynamic bias compensated inertial measurement, according to the present invention.

FIG. 9 is a block diagram illustrating the steps of the example method 70 described above, for making a bias compensated inertial measurement according to the present invention, using a plurality of independently rotatable micromechanical sensors, wherein one of the plurality of sensors is rotated while the remainder of the plurality remain fixed in their orientations. By this method, sensor bias errors are that can contribute to an error in an inertial calculation are compensated for over time, by accumulating alternate sign values of the bias error for each rotational cycle of the sensor.

The geometry shown in FIGS. 8A and 8B is one of many that can be used in the practice of the present invention. A plurality of sensors comprising a number of sensors one greater than the number of coordinate axes of interest can be employed. For example, three sensors can be used where inertial measurements are desired along two orthogonal axes, and four sensors are employed where inertial measurements are desired along three orthogonal axes. Sensors 10 (*a–d*) may comprise micromechanical accelerometers or angular rate sensors (e.g. a gyroscope or gyro). IMUs generally comprise accelerometers and gyros.

In another embodiment of the invention a total of eight independently rotatable sensors, four gyroscopes and four accelerometers could be used to implement a three-axis IMU. The method illustrated above would still be used to calculate the inertial measurements in the desired X, Y and Z coordinate axes, with an accelerometer and a gyroscope each being rotated at each step. In this example embodiment, accelerometer and gyroscope pairs could be co-located on non-coplanar surfaces of a base or in an alternative embodiment, accelerometers and gyroscopes could be disposed on the faces of a nested pair of pyramidal base geometries.

What is claimed is:

1. An inertial sensor comprising:
a rotatable MEM stage;
a MEM inertial sense element, comprising a sense axis, disposed on the rotatable MEM stage;
means for rotating the MEM stage, about an axis substantially perpendicular to the sense axis of the MEM inertial sense element; and,
means for electrically accessing the MEM inertial sense element, at at least two angular positions of the rotatable MEM stage.

2. The inertial sensor of claim 1, wherein the MEM inertial sense element comprises a sense element selected from the group consisting of: an accelerometer, an angular rate sensor, and both.

3. The inertial sensor of claim 1, wherein the rotatable MEM stage is rotatable through an angle of up to 360 degrees.

4. The inertial sensor of claim 3, wherein the rotatable MEM stage is rotatable through an angle substantially equal to 180 degrees.

5. The inertial sensor of claim 1, wherein the means for electrically accessing the MEM inertial sense element comprises a plurality of compliant electrical conductors.

6. The inertial sensor of claim 5, wherein each compliant electrical conductor comprises silicon.

7. The inertial sensor of claim 1, wherein the means for electrically accessing the MEM inertial sense element comprises a plurality of MEM contactors.

8. The inertial sensor of claim 1 wherein the means for rotating the rotatable MEM stage comprises at least one MEM actuator selected from the group consisting of: electrostatic actuators, electromagnetic actuators, piezoelectric actuators, shape memory alloy actuators, phase change based actuators and thermal actuators.

9. The inertial sensor of claim 1 wherein the MEM inertial sense element comprises a surface micromachined sense element.

10. The inertial sensor of claim 9 wherein the rotatable MEM stage comprises a LIGA micromachined rotatable stage.

11. The inertial sensor of claim 9 wherein the rotatable MEM stage comprises a surface micromachined rotatable stage.

12. An inertial measurement unit comprising;
a base having at least one surface;
at least two rotatable MEM stages disposed on the at least one surface, each of the at least two MEM stages being independently rotatable about a rotational axis lying substantially along a normal axis to the surface upon which the rotatable MEM stage is disposed;
at least two MEM inertial sense elements, each having a sense axis, the at least two MEM inertial sense elements being disposed on the at least two MEM rotatable stages, wherein the sense axes of the at least two MEM inertial sense elements, are substantially perpendicular to the rotational axis of the rotatable MEM stage, upon which the MEM inertial sense element is disposed;
means for independently rotating each of the at least two rotatable MEM stages; and,
means for electrically accessing the at least two MEM inertial sense elements at, at least two angular positions of each of the at least two rotatable MEM stages.

13. The inertial measurement unit of claim 12 wherein the base having at least one surface, comprises a base having four non-coplanar surfaces arranged in a pyramidal geometry.

14. The inertial measurement unit of claim 13 wherein the at least two MEM inertial sense elements further comprises four MEM inertial sense elements, singly disposed on four independently rotatable MEM stages, each independently rotatable MEM stage being singly disposed on one of the four non coplanar surfaces arranged in a pyramidal geometry.

15. The inertial measurement unit of claim 12 wherein the at least two MEM inertial sense elements comprise at least two MEM inertial sense elements, one or more selected from the group consisting of: an accelerometer, an angular rate sensor, or both.

16. The inertial measurement unit of claim 12 wherein the sense axes of the at least two MEM inertial sense elements are non-collinear.

17. The inertial measurement unit of claim 12 wherein the at least two rotatable MEM stages are rotatable through an angle of up to 360 degrees.

18. The inertial measurement unit of claim 17 wherein the at least two rotatable MEM stages are rotatable through an angle of substantially equal to 180 degrees.

19. The inertial measurement unit of claim 12 wherein the means for electrically accessing the at least two MEM inertial sense elements comprises a plurality of compliant electrical conductors.

20. The inertial measurement unit of claim 19 wherein the plurality of compliant electrical conductors comprise silicon.

21. The inertial measurement unit of claim 12 wherein the means for electrically accessing the at least two MEM inertial sense elements comprises a plurality of MEM contactors.

22. The inertial measurement unit of claim 12 wherein the means for independently rotating each of the at least two rotatable MEM stages comprises at least one MEM actuator selected from the group consisting of: an electrostatic actuator, an electromagnetic actuator, a piezoelectric actuator, a shape memory alloy actuator, a phase change based actuator and a thermal actuator.

23. The inertial measurement unit of claim 12 wherein the at least two rotatable MEM stages comprises at least two rotatable MEM stages selected from the group consisting of: a LIGA MEM stage, a surface micromachined MEM stage, and both.

* * * * *